Figure 1:
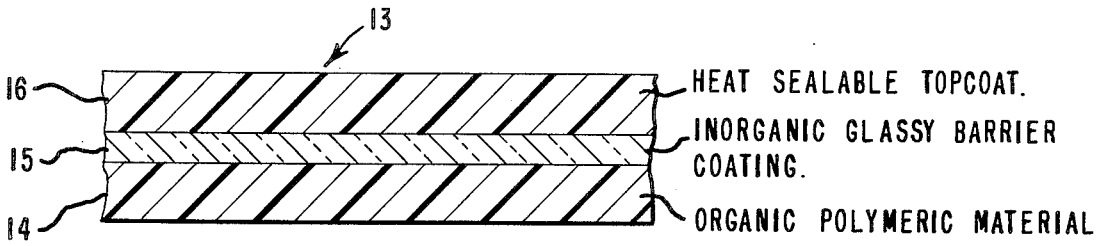
Figure 2:
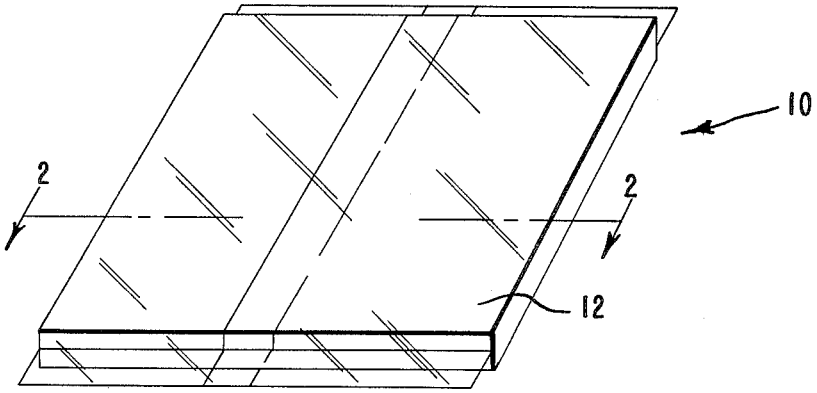
Figure 3:
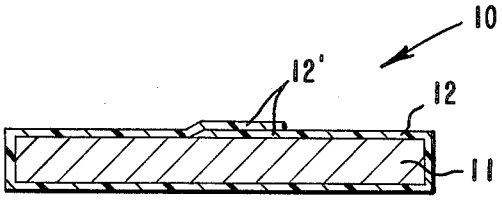

United States Defensive Publication [19] (H) [11] T971,007

Hecht [43] June 6, 1978

[54] MICROWAVE TREATMENT OF PACKAGE FOODS

[75] Inventor: James L. Hecht, Richmond, Va.

[73] Assignee: E. I. du Pont de Nemours and Company, Wilmington, Del.

[21] Appl. No.: 713,353

[22] Filed: Aug. 11, 1976

Related U.S. Application Data

[63] Continuation of Ser. No. 616,834, Sep. 25, 1975, abandoned, which is a continuation-in-part of Ser. No. 500,497, Aug. 26, 1974, abandoned, which is a continuation of Ser. No. 375,048, Jun. 29, 1973, abandoned.

[51] Int. Cl.[2] ..... A23L 3/00

[52] U.S. Cl. ..... 426/234; 426/107

[57] ABSTRACT

The shelf-life of food is improved by sterilizing such food by heating it in a container having oxygen barrier properties, by microwave energy, for a time and temperature necessary to product sterilization. Such container is formed of a laminate including an organic polymeric material coated with an inorganic glassy barrier material and with a heat-sealable topcoat. The coating is from 0.02 to 2 microns thick and includes over 50% metal phosphate selected from aluminum and iron phosphates. The atom ratio of metal to phosphorus is about from 2.2 to 0.5 and up to about 50% of the metal ions may be replaced by tin, titanium or zirconium ions.

1 Claim, 1 Sheet Drawing,

16 Pages Specification

The file of this unexamined application may be inspected and copies thereof may be purchased (849 O.G. 1221, Apr. 9, 1968).